(12) United States Patent
Katayama

(10) Patent No.: US 11,945,381 B2
(45) Date of Patent: Apr. 2, 2024

(54) IN-VEHICLE SYSTEM

(71) Applicant: Mitsubishi Electric Corporation, Tokyo (JP)

(72) Inventor: Masahiko Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 17/799,732

(22) PCT Filed: Apr. 17, 2020

(86) PCT No.: PCT/JP2020/016848
§ 371 (c)(1),
(2) Date: Aug. 15, 2022

(87) PCT Pub. No.: WO2021/210157
PCT Pub. Date: Oct. 21, 2021

(65) Prior Publication Data
US 2023/0074114 A1 Mar. 9, 2023

(51) Int. Cl.
*B60R 16/023* (2006.01)
*H01B 11/02* (2006.01)

(52) U.S. Cl.
CPC ............ *B60R 16/023* (2013.01); *H01B 11/02* (2013.01)

(58) Field of Classification Search
CPC .............................. B60R 16/023; H01B 11/02
See application file for complete search history.

(56) References Cited

U.S. PATENT DOCUMENTS

| | | |
|---|---|---|
| 2008/0147316 A1 | 6/2008 | Okawa |
| 2014/0034383 A1 | 2/2014 | Hayashi et al. |
| 2021/0203140 A1 | 7/2021 | Kimoto |

FOREIGN PATENT DOCUMENTS

| | | |
|---|---|---|
| DE | 11 2012 001 687 T5 | 1/2014 |
| DE | 10 2016 220 166 A1 | 4/2018 |
| DE | 11 2019 002 856 T5 | 2/2021 |

(Continued)

OTHER PUBLICATIONS

Communication from the German Patent Office dated Jan. 30, 2023 in German Patent Application No. 11 2020 007 091.3.

(Continued)

*Primary Examiner* — Robert L Deberadinis
(74) *Attorney, Agent, or Firm* — Sughrue Mion, PLLC; Richard C. Turner

(57) ABSTRACT

An in-vehicle system is provided with a first in-vehicle unit having a first electric signal transfer part, a first substrate wiring, and a first connector; a second in-vehicle unit having a second electric signal transfer part, a second substrate wiring, a third substrate wiring, a second connector, and a third connector; a third in-vehicle unit having a third electric signal transfer part, a fourth substrate wiring, a fifth substrate wiring, and a fourth connector; a first insulated sheathed cable connecting the first connector and the second connector; and a second insulated sheathed cable connecting the third connector and the fourth connector. When the first insulated sheathed cable is connected, the first substrate wiring and the third substrate wiring become conductive. When the second insulated sheathed cable is connected, the second substrate wiring and the fifth substrate wiring become conductive, and the third substrate wiring and the fourth substrate become conductive.

7 Claims, 9 Drawing Sheets

(56) References Cited

FOREIGN PATENT DOCUMENTS

| | | | |
|---|---|---|---|
| JP | 2003-320911 | A | 11/2003 |
| JP | 2004-273369 | A | 9/2004 |
| JP | 2008-152387 | A | 7/2008 |
| JP | 2010-237152 | A | 10/2010 |
| JP | 2015-089583 | A | 5/2015 |
| JP | 2016-121922 | A | 7/2016 |
| JP | 2018-055427 | A | 4/2018 |

OTHER PUBLICATIONS

International Search Report for PCT/JP2020/016848, dated Jun. 9, 2020.
Office Action dated Sep. 6, 2022 from the Japanese Patent Office in JP Application No. 2022-515160.

IN-VEHICLE SYSTEM

CROSS REFERENCE TO RELATED APPLICATIONS

This application is a National Stage of International Application No. PCT/JP2020/016848 filed Apr. 17, 2020.

TECHNICAL FIELD

The present application relates to the field of an in-vehicle system.

BACKGROUND ART

As described in the Patent Document 1, a peripheral monitoring instrument of vehicle use is developed, in which a plurality of radar installations (in-vehicle units) is processed by an ECU (Electronic Control Unit) of peripheral monitoring instrument use. In such a peripheral monitoring instrument of vehicle use, if the processing performance of the in-vehicle units is highly improved, the amount of communications to the ECU of peripheral monitoring instrument use will increase, and improvement in the communication speed will be needed. Therefore, it is necessary to communicate on a one-to-one basis between a plurality of radar installations and the ECU of peripheral monitoring instrument use. Further, with the increase of the number of cables required for communications, the weight of cables increases in the peripheral monitoring instrument of vehicle use.

Moreover, in the Patent Document 2, a vehicle control system is described, which is configured in such a way that a device for once uniting signals is arranged, and those signals are transmitted from the device. According to the vehicle control system having such a constitution, weight reduction of cables can be attained by employing one set of signal lines and one set of power supply lines. However, according to the constitution like the above example, a device for uniting signals is needed separately.

CITATION LIST

Patent Literature

Patent Document 1: JP 2008-152387A
Patent Document 2: JP 2003-320911A

SUMMARY OF THE INVENTION

Technical Problem

The present application is made in order to solve the above-mentioned subjects in the in-vehicle system which is equipped with a plurality of in-vehicle units. That is, in the in-vehicle system which is equipped with a plurality in-vehicle units, the present application aims at offering an in-vehicle system which is capable of reducing the weight of cables, by aggregating cables for connecting between in-vehicle units, without using another device for uniting signals.

Solution to Problem

The in-vehicle system according to the present application, includes:

a first in-vehicle unit, having a first electric signal transfer part, a first substrate wiring, and a first connector, in which the first substrate wiring connects the first electric signal transfer part and the first connector, a second in-vehicle unit, having a second electric signal transfer part, a second substrate wiring, a third substrate wiring, a second connector, and a third connector, in which the second substrate wiring connects the second electric signal transfer part and the third connector, and moreover, the third substrate wiring connects the second connector and the third connector, a third in-vehicle unit, having a third electric signal transfer part, a fourth substrate wiring, a fifth substrate wiring, and a fourth connector, in which the fourth substrate wiring connects the third electric signal transfer part and the fourth connector, and moreover, the fifth substrate wiring connects the third electric signal transfer part and the fourth connector, a first insulated sheathed cable, connecting the first connector and the second connector, and a second insulated sheathed cable, connecting the third connector and the fourth connector, wherein, when the first insulated sheathed cable is connected to the first connector and the second connector, the first substrate wiring and the third substrate wiring become conductive, and when the second insulated sheathed cable is connected to the third connector and the fourth connector, the second substrate wiring and the fifth substrate wiring become conductive, and moreover, the third substrate wiring and the fourth substrate wiring become conductive.

Advantageous Effects of Invention

The in-vehicle system according to the present application, includes:

a first in-vehicle unit, having a first electric signal transfer part, a first substrate wiring, and a first connector, in which the first substrate wiring connects the first electric signal transfer part and the first connector, a second in-vehicle unit, having a second electric signal transfer part, a second substrate wiring, a third substrate wiring, a second connector, and a third connector, in which the second substrate wiring connects the second electric signal transfer part and the third connector, and moreover, the third substrate wiring connects the second connector and the third connector, a third in-vehicle unit, having a third electric signal transfer part, a fourth substrate wiring, a fifth substrate wiring, and a fourth connector, in which the fourth substrate wiring connects the third electric signal transfer part and the fourth connector, and moreover, the fifth substrate wiring connects the third electric signal transfer part and the fourth connector, a first insulated sheathed cable, connecting the first connector and the second connector, and a second insulated sheathed cable, connecting the third connector and the fourth connector, wherein, when the first insulated sheathed cable is connected to the first connector and the second connector, the first substrate wiring and the third substrate wiring become conductive, and when the second insulated sheathed cable is connected to the third connector and the fourth connector, the second substrate wiring and the fifth substrate wiring become conductive, and moreover, the third substrate wiring and the fourth substrate wiring become conductive.

Therefore, cables for connecting between in-vehicle units are aggregated, without using another device for uniting signals, and then, it becomes possible to offer an in-vehicle system which is capable of reducing the weight of cables.

DESCRIPTION OF EMBODIMENTS

Figure 1:
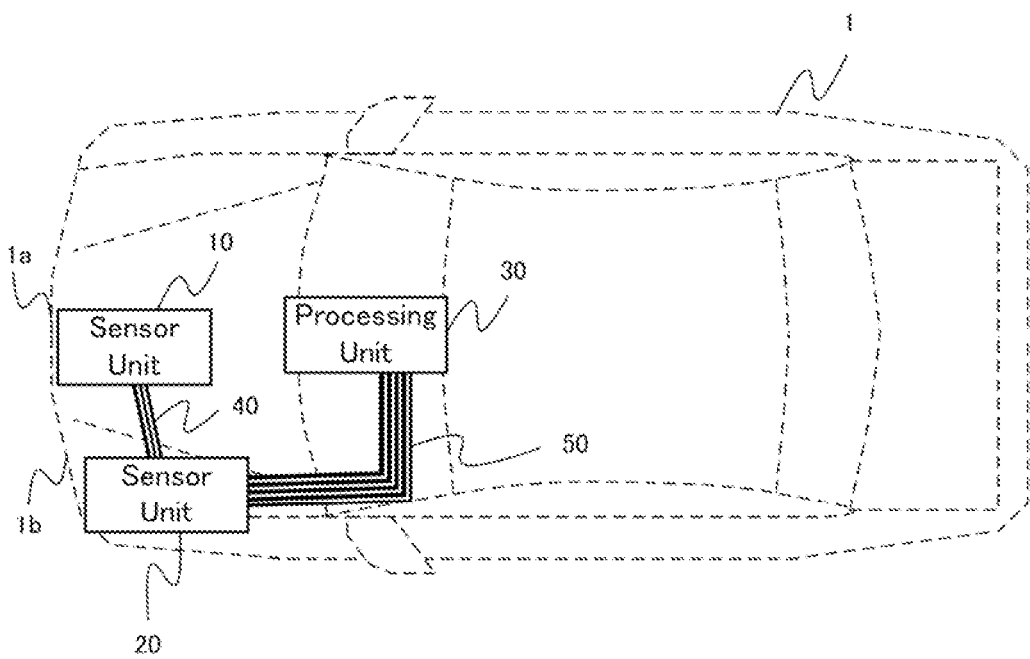
FIG. 1 is a drawing showing the arrangement relationship between an in-vehicle unit system and a vehicle, according to the Embodiment 1.

Hereinafter, an in-vehicle system according to the Embodiments of the present application will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the in-vehicle system are further actually provided with a plurality of members, for ease of explanation, only portions necessary for explanation will be described and other portions are omitted.

Embodiment 1

Hereinafter, explanation will be made about an in-vehicle system according to the Embodiment 1, based on drawings. FIG. 1 is an arrangement plan showing the constitution of the in-vehicle system according to the Embodiment 1. The in-vehicle system 100 according to the present Embodiment is mounted in a vehicle 1. The in-vehicle system 100 consists of a sensor unit 10 (a first in-vehicle unit), a sensor unit 20 (a second in-vehicle unit), a processing unit 30 (a third in-vehicle unit), an insulated sheathed cable 40 (a first insulated sheathed cable), an insulated sheathed cable 50 (a second insulated sheathed cable), and the like.

The sensor unit 10 (the first in-vehicle unit) and the sensor unit 20 (the second in-vehicle unit) are attached to the vehicle 1, and both of them are sensors for detecting objects around the vehicle 1. For example, the sensor unit 10 (the first in-vehicle unit) and the sensor unit 20 (the second in-vehicle unit) are millimeter wave radar devices, and those units are devices for detecting the distance, direction, and speed of an object (an obstacle), using the time of flight of the reflective wave to the output millimeter waves, the angle of reflective waves, and the change of frequency.

The sensor unit 10 (the first in-vehicle unit) is arranged, for example, behind a front grille 1a of the vehicle 1, and is the one to supervise mainly an obstacle which exists ahead of the host vehicle. It is worth noticing that, the front grille 1a means a front face net, and the central portion of the driving direction face (the front face) of a host vehicle is called in this way. Obstacles here contain a preceding vehicle (a vehicle which travels at the front side of a host vehicle, and in addition, runs on the same lane and in the same direction as the host vehicle). A hole part is formed in one of the side parts (for example, a left-hand side part) of the front bumper 1b of the vehicle 1, and the sensor unit 20 (the second in-vehicle unit) is arranged at the hole part, for example. The sensor unit is the one to supervise mainly an obstacle entering the front of a host vehicle from the side (for example, an interrupting vehicle, a pedestrian, a bicycle, and others).

The processing unit 30 (the third in-vehicle unit) is arranged, for example, in the car room of the vehicle 1, and is a computer unit, in which read-only memory, random access memory, etc. are mutually connected through a bus, with a central processing unit on the center. Other than those, the processing unit is provided with an I/O port, a timer, a counter, and the like. In the read-only memory of the processing unit 30 (the third in-vehicle unit), the program which the central processing unit executes and data are stored.

The processing unit 30 (the third in-vehicle unit) performs the output control and on-off control of the sensor unit 10 (the first in-vehicle unit) and the sensor unit 20 (the second in-vehicle unit), and in addition, receives the outputs of the sensor unit 10 (the first in-vehicle unit) and the sensor unit 20 (the second in-vehicle unit). From the outputs of the sensor unit 10 (the first in-vehicle unit) and the sensor unit 20 (the second in-vehicle unit), the processing unit 30 (the third in-vehicle unit) judges whether there exists an obstacle or not. When it is judged that an obstacle exists, the processing unit outputs the position and relative velocity of the obstacle, to other electronic control units, through multiple communication lines and the like.

The insulated sheathed cable 40 (the first insulated sheathed cable) is an insulated sheathed cable, using a twisted pair wiring (a first twisted pair wiring), for example, STP (Shielded Twisted Pair) cables and the like. Further, the insulated sheathed cable is a shielded cable for connecting the sensor unit 10 (the first in-vehicle unit) and the sensor unit 20 (the second in-vehicle unit). The insulated sheathed cable 50 (the second insulated sheathed cable) is an insulated sheathed cable, using two sets of twisted pair wirings (a second twisted pair wiring and a third twisted pair wiring), for example, STQ (Shielded Twisted Quad) cables and the like. Further, the insulated sheathed cable is a shielded cable for connecting the sensor unit 20 (the second in-vehicle unit) and the processing unit 30 (the third in-vehicle unit). In the center of the bonnet of the vehicle 1, an engine is arranged.

As for the wiring between the sensor unit 10 (the first in-vehicle unit) and the processing unit 30 (the third in-vehicle unit), it is necessary to install wiring avoiding the engine located in the center of a bonnet. Thereby, after the sensor unit 10 is once connected with the sensor unit 20 (the second in-vehicle unit) using the insulated sheathed cable 40 (the first insulated sheathed cable), the processing unit 30 (the third in-vehicle unit) is wired with the sensor unit 20, using the insulated sheathed cable 50 (the second insulated sheathed cable) via the end part of the bonnet. As for the wiring between the sensor unit 20 (the second in-vehicle unit) and the processing unit 30 (the third in-vehicle unit), wiring is installed from the sensor unit 20 (the second in-vehicle unit) to the processing unit 30 (the third in-vehicle unit), with the insulated sheathed cable 50 (the second insulated sheathed cable), via the end part of the bonnet.

Figure 2:
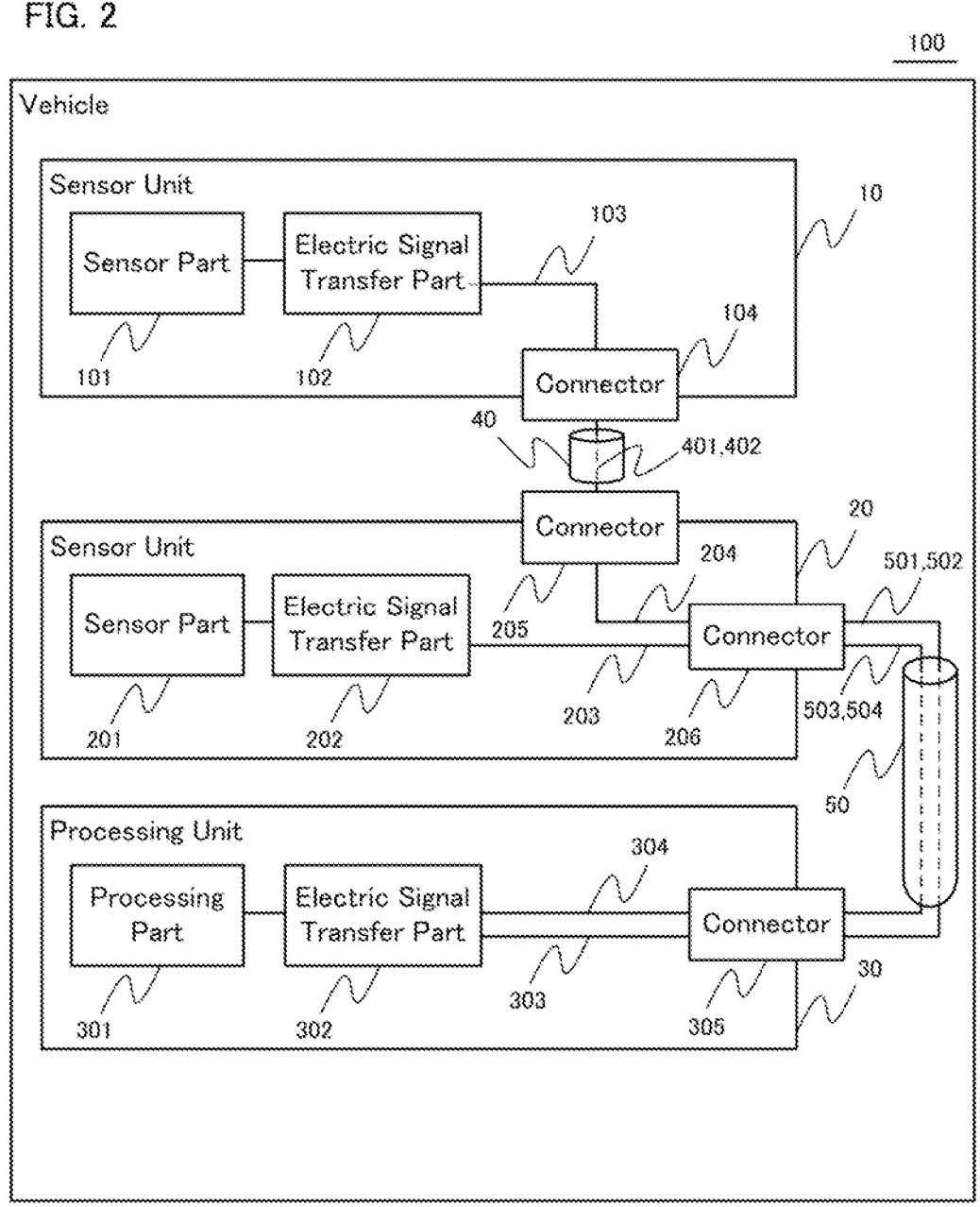
FIG. 2 is a constitution diagram showing the in-vehicle system according to the Embodiment 1.

In FIG. 2, shown is the constitution diagram of the in-vehicle system 100 according to the present Embodiment. The sensor unit 10 (the first in-vehicle unit) according to the present Embodiment consists of a sensor part 101 (a first sensor part), an electric signal transfer part 102 (a first electric signal transfer part), a substrate wiring 103 (a first substrate wiring), a connector 104 (a first connector), and the like. In the present Embodiment, the sensor part 101 (the first sensor part) is a millimeter wave radar device. Other than the millimeter wave radar device, the sensor part can include a laser radar, an infrared radar, a camera device, and others. The electric signal transfer part 102 (the first electric signal transfer part), which is connected with the sensor part 101 by substrate wiring, is the one to perform communications for transmitting the distance, direction, and speed of an object (an obstacle) detected by the sensor part 101, to the processing unit 30 (the third in-vehicle unit).

The substrate wiring 103 (the first substrate wiring) is a wiring on the substrate, prepared so that the electric signal transfer part 102 and the connector 104 may be connected, in order to transmit electric signals between the electric signal transfer part 102 and the processing unit 30 (the third in-vehicle unit), through the insulated sheathed cable 40, the sensor unit 20 (the second in-vehicle unit), and the insulated sheathed cable 50. For example, the substrate wiring 103 can employ a differential micro strip line, a differential strip line, and a coplanar line, where those lines have a differential impedance of 100 ohms. The connector 104 (the first connector) is, for example, a two-pole connector, which is mounted on the substrate of the sensor unit 10 (the first in-vehicle unit), in order to fit with the insulated sheathed cable 40 which has a differential signal line 401 and a differential signal line 402.

The sensor unit 20 (the second in-vehicle unit) consists of a sensor part 201 (a second sensor part), an electric signal transfer part 202 (a second electric signal transfer part), a substrate wiring 203 (a second substrate wiring), a substrate wiring 204 (a third substrate wiring), a connector 205 (a second connector), a connector 206 (a third connector), and the like. In the present Embodiment, the sensor part 201 (the second sensor part) is a millimeter wave radar device. Other than the millimeter wave radar device, the sensor part can include a laser radar, an infrared radar, a camera device, and the like. The electric signal transfer part 202 (the second electric signal transfer part), which is connected with the sensor part 201 by substrate wiring, is the one to perform communications for transmitting the distance, direction, and speed of an object (an obstacle) detected by the sensor part 201, to the processing unit 30 (the third in-vehicle unit).

The substrate wiring 203 (the second substrate wiring) is a wiring on the substrate, prepared so that the electric signal transfer part 202 and the connector 206 may be connected, in order to transmit electric signals between the electric signal transfer part 202 and the processing unit 30 (the third in-vehicle unit), through the insulated sheathed cable 50. For example, the substrate wiring 203 can employ a differential micro strip line, a differential strip line, and a coplanar line, where those lines have a differential impedance of 100 ohms. The connector 205 (the second connector) is provided in order to transmit electric signals between the sensor unit 10 (the first in-vehicle unit) and the processing unit 30 (the third in-vehicle unit), through the insulated sheathed cable 40, the sensor unit 20 (the second in-vehicle unit), and the insulated sheathed cable 50.

The substrate wiring 204 (the third substrate wiring) is a wiring on the substrate, prepared so that the connector 205 and the connector 206 may be connected. For example, the substrate wiring 204 can employ a differential micro strip line, a differential strip line, and a coplanar line, where those lines have a differential impedance of 100 ohms. The connector 205 (the second connector) is, for example, a two-pole connector, which is mounted on the substrate of the sensor unit 20 (the second in-vehicle unit), in order to fit with the insulated sheathed cable 40. The connector 206 (the third connector) is, for example, a four-pole connector, which is mounted on the substrate of the sensor unit 20 (the second in-vehicle unit), in order to fit with the insulated sheathed cable 50 which has a differential signal line 501, a differential signal line 502, a differential signal line 503, and a differential signal line 504.

The processing unit 30 (the third in-vehicle unit) consists of a processing part 301, an electric signal transfer part 302 (a third electric signal transfer part), a substrate wiring 303 (a fourth substrate wiring), a substrate wiring 304 (a fifth substrate wiring), a connector 305 (a fourth connector), and the like. The processing part 301 performs the output control and on-off control of the sensor unit 10 (the first in-vehicle unit) and the sensor unit 20 (the second in-vehicle unit), through the electric signal transfer part 302 connected by substrate wiring, and in addition, receives the outputs from the sensor unit 10 (the first in-vehicle unit) and the sensor unit 20 (the second in-vehicle unit). Based on the outputs received from the sensor unit 10 (the first in-vehicle unit) and the sensor unit 20 (the second in-vehicle unit), the processing part 301 judges whether there exists an obstacle or not. When it is judged that an obstacle exists, the processing part 301 outputs the position and relative velocity of the obstacle, to other electronic control units, through multiple communication lines and the like.

The electric signal transfer part 302 (the third electric signal transfer part) is the one to communicate with the sensor unit 10 (the first in-vehicle unit) and the sensor unit 20 (the second in-vehicle unit). The substrate wiring 303 (the fourth substrate wiring) is a wiring on the substrate, prepared so that the electric signal transfer part 302 and the connector 305 may be connected, in order to transmit electric signals between the electric signal transfer part 302 and the sensor unit 10 (the first in-vehicle unit), through the insulated sheathed cable 50, the sensor unit 20 (the second in-vehicle unit), and the insulated sheathed cable 40. For example, the substrate wiring 303 can employ a differential micro strip line, a differential strip line, and a coplanar line, where those lines have a differential impedance of 100 ohms.

The substrate wiring 304 (the fifth substrate wiring) is a wiring on the substrate, prepared so that the electric signal transfer part 302 and the connector 305 may be connected, in order to transmit electric signals between the electric signal transfer part 302 and the sensor unit 20 (the second in-vehicle unit), through the insulated sheathed cable 50. For example, the substrate wiring 304 can employ a differential micro strip line, a differential strip line, and a coplanar line, where those lines have a differential impedance of 100 ohms. The connector 305 (the fourth connector) is, for example, a four-pole connector, which is mounted on the substrate of the processing unit 30 (the third in-vehicle unit), in order to fit with the insulated sheathed cable 50. It is worth noticing that, although a single line is used to show a substrate wiring in the drawing, the substrate wiring is actually a twisted pair wiring which consists of two conductor lines.

Figure 3:
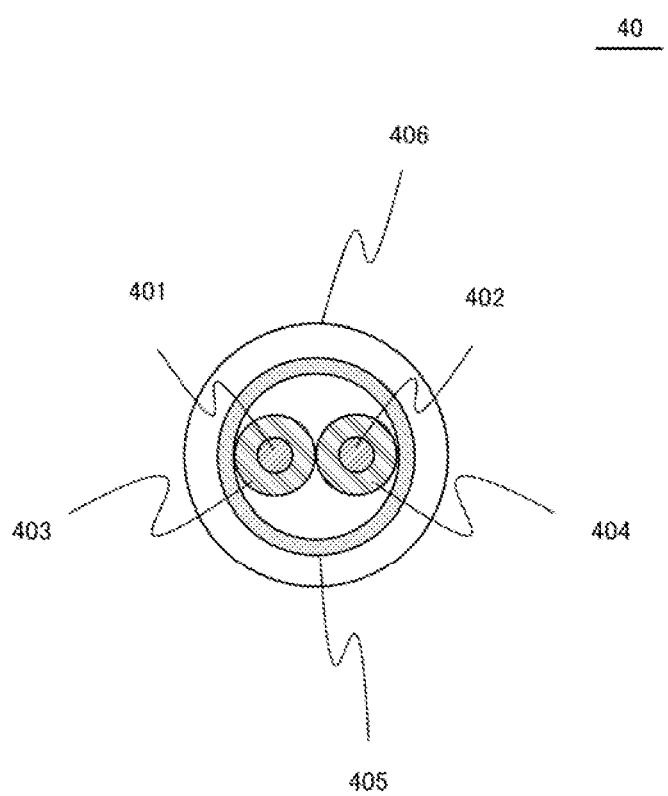
FIG. 3 is a sectional view showing the internal structure of the insulated sheathed cable 40 according to the Embodiment 1.

FIG. 3 shows a sectional view of the insulated sheathed cable 40 (the first insulated sheathed cable). In the insulated sheathed cable 40, the differential signal line 401 and the differential signal line 402 are respectively coated with the insulating layer 403 and the insulating layer 404, and those signal lines are bundled in that state to form a twisted pair wiring (a first twisted pair wiring). The insulated sheathed cable 40 has a configuration in which, a conductor film 405 (a first conductor film) and an insulated protective film 406 are coated sequentially around a twisted pair wiring (a first twisted pair wiring). It is worth noticing that, predetermined conductor films, such as composite film composed of aluminum foil and polyester film (AL-PET) or aluminum tape of shield use, can be used for the conductor film 405 (the first conductor film). One end of the insulated sheathed cable 40 is combined with the connector 104, and the other end is combined with the connector 205.

Figure 4:
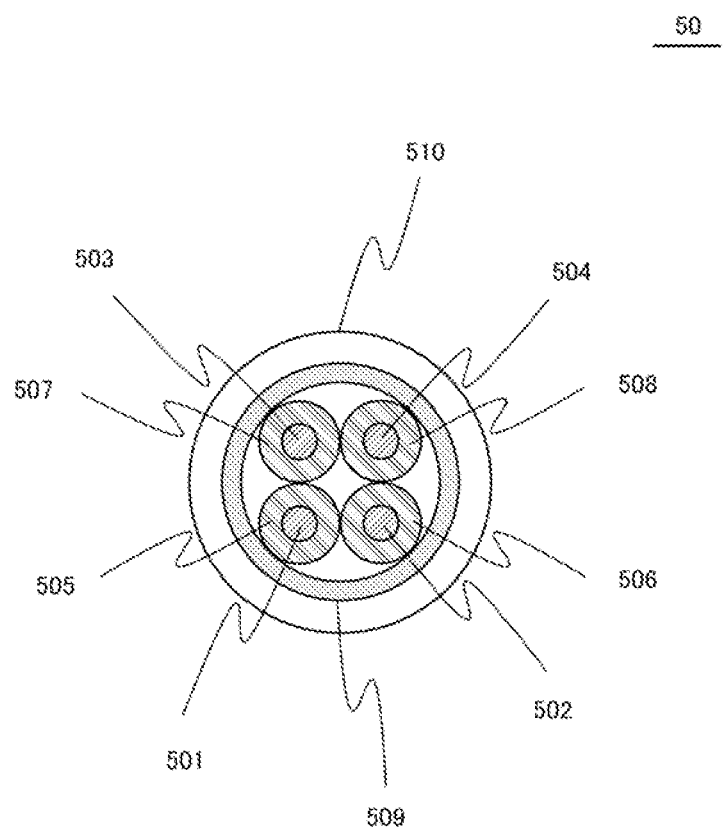
FIG. 4 is a sectional view showing the internal structure of the insulated sheathed cable 50 according to the Embodiment 1.

FIG. 4 shows the sectional view of the insulated sheathed cable 50 (the second insulated sheathed cable). The insulated sheathed cable 50 has a configuration in which a conductor film 509 (a second conductor film) and an insulated protective film 510 are coated sequentially around two sets of twisted pair wirings (a second twisted pair wiring and a third twisted pair wiring). It is worth noticing that, predetermined conductor films, such as composite film composed of aluminum foil and polyester film (AL-PET) or aluminum tape of shield use, are used for the conductor film 509 (the second conductor film). In the first set of twisted pair wirings (the second twisted pair wiring), the differential signal line 501 and the differential signal line 502 are respectively coated with the insulating layer 505 and the insulating layer 506, and those signal lines are bundled in that state to form a twisted pair wiring. In the second set of twisted pair wirings (the third twisted pair wiring), the differential signal line 503 and the differential signal line 504 are respectively coated with the insulating layer 507 and the insulating layer 508, and those signal lines are bundled in that state to form a twisted pair wiring. One end of the insulated sheathed cable 50 is combined with the connector 206, and the other end is combined with the connector 305.

Between the electric signal transfer part 102 of the sensor unit 10 (the first in-vehicle unit) and the electric signal transfer part 302 of the processing unit 30 (the third in-vehicle unit), electric signals are used to communicate, where the electric signal is transmitted through the following course; the substrate wiring 103→the connector 104→the differential signal line 401 and the differential signal line 402→the connector 205→the board wiring 204→the connector 206→the differential signal line 503 and the differential signal line 504→the connector 305→the board wiring 303. Between the electric signal transfer part 202 of the sensor unit 20 (the second in-vehicle unit) and the electric signal transfer part 302 of the processing unit 30 (the third in-vehicle unit), electric signals are used to communicate, where the electric signal is transmitted through the following course; the substrate wiring 203→the connector 206→the differential signal line 501 and the differential signal line 502→the connector 305→the board wiring 304.

In the present Embodiment, the sensor unit 20 (the second in-vehicle unit) will be arranged on the cabling route between the processing unit 30 (the third in-vehicle unit) and the sensor unit 10 (the first in-vehicle unit). The insulated sheathed cable 40 is located behind the front grille 1*a*, and is used for the connection between the sensor unit 20 (the second in-vehicle unit) and the sensor unit 10 (the first in-vehicle unit). The insulated sheathed cable 50 is cabled from the foot step of a front passenger seat to the instrument panel, through the left-hand side part of an engine room, and is used for the connection between the sensor unit 20 (the second in-vehicle unit) and the processing unit 30 (the third in-vehicle unit).

According to present Embodiment, in the sensor unit 20 (the second in-vehicle unit), the insulated sheathed cable includes a conductor film and an insulated protective film, each of which is employed in common. In the sensor unit 20 (the second in-vehicle unit), one insulated sheathed cable is used to cable with the sensor unit 10, and another is used to cable with the processing unit 30. Then, it becomes possible to reduce the weight of insulated sheathed cables. As an example, the cross-sectional area (conductor film+insulated protective film) of the insulated sheathed cable 40 will become $\pi d(d+2r)$, where symbol r is the radius of differential signal line+insulating layer, and symbol d is the thickness of conductor film+insulated protective film. Similarly, the cross-sectional area (conductor film+insulated protective film) of the insulated sheathed cable 50 becomes $\pi d\{d+(\sqrt{2}+1)r\}$.

According to the vehicle use peripheral monitoring instrument described in the Background Art (Patent Document 1), a plurality of radar devices communicates one to one with an electronic control unit. Then, the issue is the reduction in the cable weight due to the increase in the number of cables. Then, in a comparative example, a vehicle is assumed in which two insulated sheathed cables are used to cable from the neighborhood of the sensor unit 20 (the second in-vehicle unit) to the processing unit 30 (the third in-vehicle unit), where the arrangement of the sensor unit 10 (the first in-vehicle unit), the sensor unit 20 (the second in-vehicle unit), and the processing unit 30 (the third in-vehicle unit) does not change. In the vehicle according to this comparative example, two insulated sheathed cables 40 are needed. For the reason above, the cross-sectional area (conductor film+insulated protective film) of the insulated sheathed cable of the comparative example becomes $2\pi d(d+2r)$.

In the insulated sheathed cable (conductor film+insulated protective film) according to the present Embodiment, the weight becomes $\{d+(\sqrt{2}+1)r\}/(2d+4r)$ of the comparative example. Then, the weight reduction of insulated sheathed cables can be attained. In terms of figures, it is possible to reduce the weight by about 50% to 60%. Moreover, in the sensor unit 20 (the second in-vehicle unit), only a connector and a substrate wiring are prepared. Then, it becomes possible to suppress the increase of cost, compared with the case where the device for aggregating signals is mounted, like the one given in the statement of the Background Art (Patent Document 2).

The in-vehicle system according to the present Embodiment relates to a system where signals of a plurality of sensors are processed in electronic control units. The electric signals of the plurality of sensors are aggregated in one sensor. After that, wirings for transmitting each electric signal are contained in one cable, and communication is performed with electronic control units. In the aggregating sensor, electric signals of a plurality of sensors are transmitted to a cable through a substrate wiring and a connector. By having such a constitution, one cable can contain wirings for transmitting electric signals of a plurality of sensors. Then, it becomes possible to reduce the weight of coatings. Moreover, inside the aggregating sensor, only substrate wiring is used to have a connection between connectors, and then, cost increase can be suppressed.

Therefore, the in-vehicle system according to the present application, includes:

a first in-vehicle unit, having a first electric signal transfer part, a first substrate wiring, and a first connector, in which the first substrate wiring connects the first electric signal transfer part and the first connector, a second in-vehicle unit, having a second electric signal transfer part, a second substrate wiring, a third substrate wiring, a second connector, and a third connector, in which the second substrate wiring connects the second electric signal transfer part and the third connector, and moreover, the third substrate wiring connects the second connector and the third connector, a third in-vehicle unit, having a third electric signal transfer part, a fourth substrate wiring, a fifth substrate wiring, and a fourth connector, in which the fourth substrate wiring connects the third electric signal transfer part and the fourth connector, and moreover, the fifth substrate wiring connects the third electric signal transfer part and the fourth connector, a first insulated sheathed cable, connecting the first connector and the second connector, and a second insulated sheathed cable, connecting the third connector and the fourth connector, wherein, when the first insulated sheathed cable is connected to the first connector and the second connector, the first substrate wiring and the third substrate wiring become conductive, and when the second insulated sheathed cable is connected to the third connector and the fourth connector, the second substrate wiring and the fifth substrate wiring become conductive, and moreover, the third substrate wiring and the fourth substrate wiring become conductive.

Further, in the in-vehicle system according to the present application, the first insulated sheathed cable has a first conductor film which covers a first twisted pair wiring, connecting the first substrate wiring and the third substrate wiring, and the second insulated sheathed cable has a second conductor film which covers a second twisted pair wiring, connecting the third substrate wiring and the fourth substrate wiring, and a third twisted pair wiring, connecting the second substrate wiring and the fifth substrate wiring.

Further, in the in-vehicle system according to the present application, the first in-vehicle unit has a first sensor part connected with the first electric signal transfer part, the second in-vehicle unit has a second sensor part connected with the second electric signal transfer part, and the third in-vehicle unit has a processing part connected with the third electric signal transfer part.

Further, in the in-vehicle system according to the present application, the first in-vehicle unit is arranged behind a front grille of a vehicle, the second in-vehicle unit is arranged at one of side parts of a front bumper of the vehicle, and the third in-vehicle unit is arranged in a car room of the vehicle.

Embodiment 2

Figure 5:
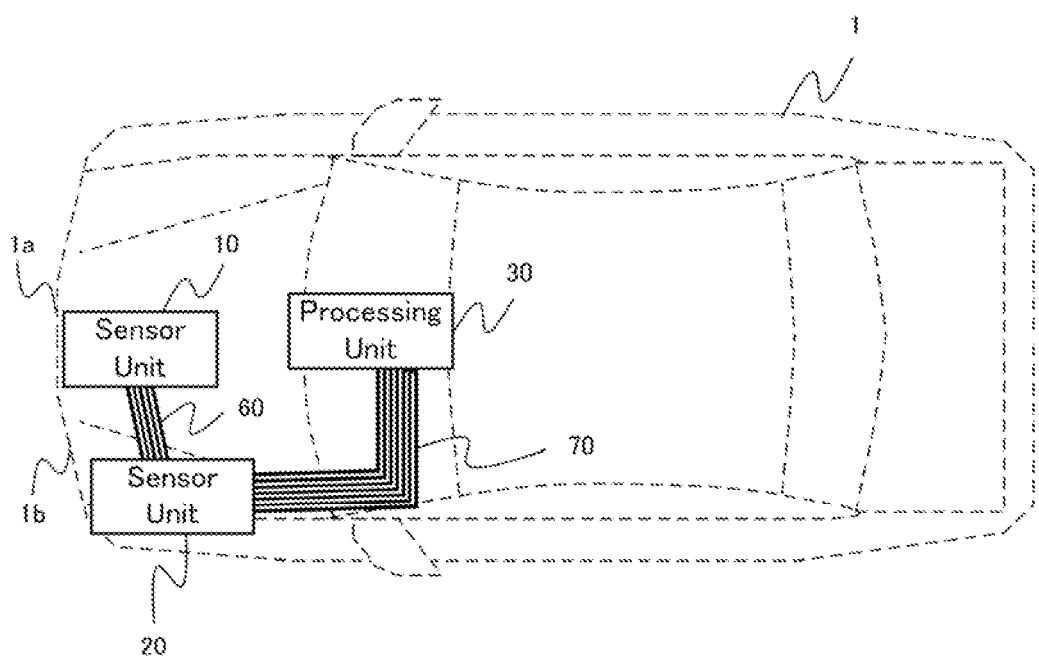
FIG. 5 is a drawing showing the arrangement relationship between an in-vehicle unit system and a vehicle, according to the Embodiment 2.

Hereinafter, explanation will be made about an in-vehicle system according to the Embodiment 2, based on drawings. In the in-vehicle system according to the Embodiment 2, each of the sensor unit 10, the sensor unit 20, and the processing unit 30 is equipped with a power supply part, and then, the constitution of an insulated sheathed cable is different from that of the in-vehicle system 100 according to the Embodiment 1. FIG. 5 is an arrangement plan showing the constitution of the in-vehicle system in the Embodiment 2. The in-vehicle system 100 according to the present Embodiment is mounted in the vehicle 1. The in-vehicle system 100 consists of a sensor unit 10 (a first in-vehicle unit), a sensor unit 20 (a second in-vehicle unit), a processing unit 30 (a third in-vehicle unit), an insulated sheathed cable 60 (a first insulated sheathed cable), an insulated sheathed cable 70 (a second insulated sheathed cable), and the like.

The sensor unit 10 (the first in-vehicle unit) and the sensor unit 20 (the second in-vehicle unit) are attached to the vehicle 1, and both units are sensors for detecting an object around the vehicle 1. For example, the sensor unit 10 (the first in-vehicle unit) and the sensor unit 20 (the second in-vehicle unit) are millimeter wave radar devices, and those units are devices for detecting the distance, direction, and speed of an object (an obstacle), using the time of flight of the reflective wave to the output millimeter waves, the angle of reflective waves, and the change of frequency.

The sensor unit 10 (the first in-vehicle unit) is arranged, for example, behind a front grille 1a of the vehicle 1, and is the one to supervise mainly an obstacle which exists ahead of the host vehicle. It is worth noticing that, the front grille 1a means a front face net, and the central portion of the driving direction face (the front face) of a host vehicle is called in this way. Obstacles here contain a preceding vehicle (a vehicle which travels at the front side of a host vehicle, and in addition, runs on the same lane and in the same direction as the host vehicle). A hole part is formed in one of the side parts (for example, a left-hand side part) of the front bumper 1b of the vehicle 1, and the sensor unit 20 (the second in-vehicle unit) is arranged at the hole part, for example. The sensor unit is the one to supervise mainly an obstacle entering the front of a host vehicle from the side (for example, an interrupting vehicle, a pedestrian, a bicycle, and others).

The processing unit 30 (the third in-vehicle unit) is arranged, for example, in the car room of the vehicle 1, and is a computer unit, in which read-only memory, random access memory, etc. are mutually connected through a bus, with a central processing unit on the center. Other than those, the processing unit is provided with an I/O port, a timer, a counter, and the like. In the read-only memory of the processing unit 30 (the third in-vehicle unit), the program which the central processing unit executes and data are stored.

The processing unit 30 (the third in-vehicle unit) performs the output control and on-off control of the sensor unit 10 (the first in-vehicle unit) and the sensor unit 20 (the second in-vehicle unit), and in addition, receives the outputs of the sensor unit 10 (the first in-vehicle unit) and the sensor unit 20 (the second in-vehicle unit). From the outputs of the sensor unit 10 (the first in-vehicle unit) and the sensor unit 20 (the second in-vehicle unit), the processing unit 30 (the third in-vehicle unit) judges whether there exists an obstacle or not. When it is judged that an obstacle exists, the processing unit outputs the position and relative velocity of the obstacle, to other electronic control units, through multiple communication lines and the like.

The insulated sheathed cable 60 (the first insulated sheathed cable) is a shielded cable for connecting the sensor unit 10 (the first in-vehicle unit) and the sensor unit 20 (the second in-vehicle unit). The insulated sheathed cable 70 (the second insulated sheathed cable) is a shielded cable for connecting the sensor unit 20 (the second in-vehicle unit) and the processing unit 30 (the third in-vehicle unit). In the center of the bonnet of the vehicle 1, an engine is arranged.

As for the wiring between the sensor unit 10 (the first in-vehicle unit) and the processing unit 30 (the third in-vehicle unit), it is necessary to install wiring avoiding the engine located in the center of a bonnet. Thereby, after the sensor unit 10 is once connected with the sensor unit 20 (the second in-vehicle unit) using the insulated sheathed cable 60 (the first insulated sheathed cable), the processing unit 30 (the third in-vehicle unit) is wired with the sensor unit 20, using the insulated sheathed cable 70 (the second insulated sheathed cable) via the end part of the bonnet. As for the wiring between the sensor unit 20 (the second in-vehicle unit) and the processing unit 30 (the third in-vehicle unit), wiring is installed from the sensor unit 20 to the processing unit 30 (the third in-vehicle unit), with the insulated sheathed cable 70 (the second insulated sheathed cable), via the end part of the bonnet.

Figure 6:
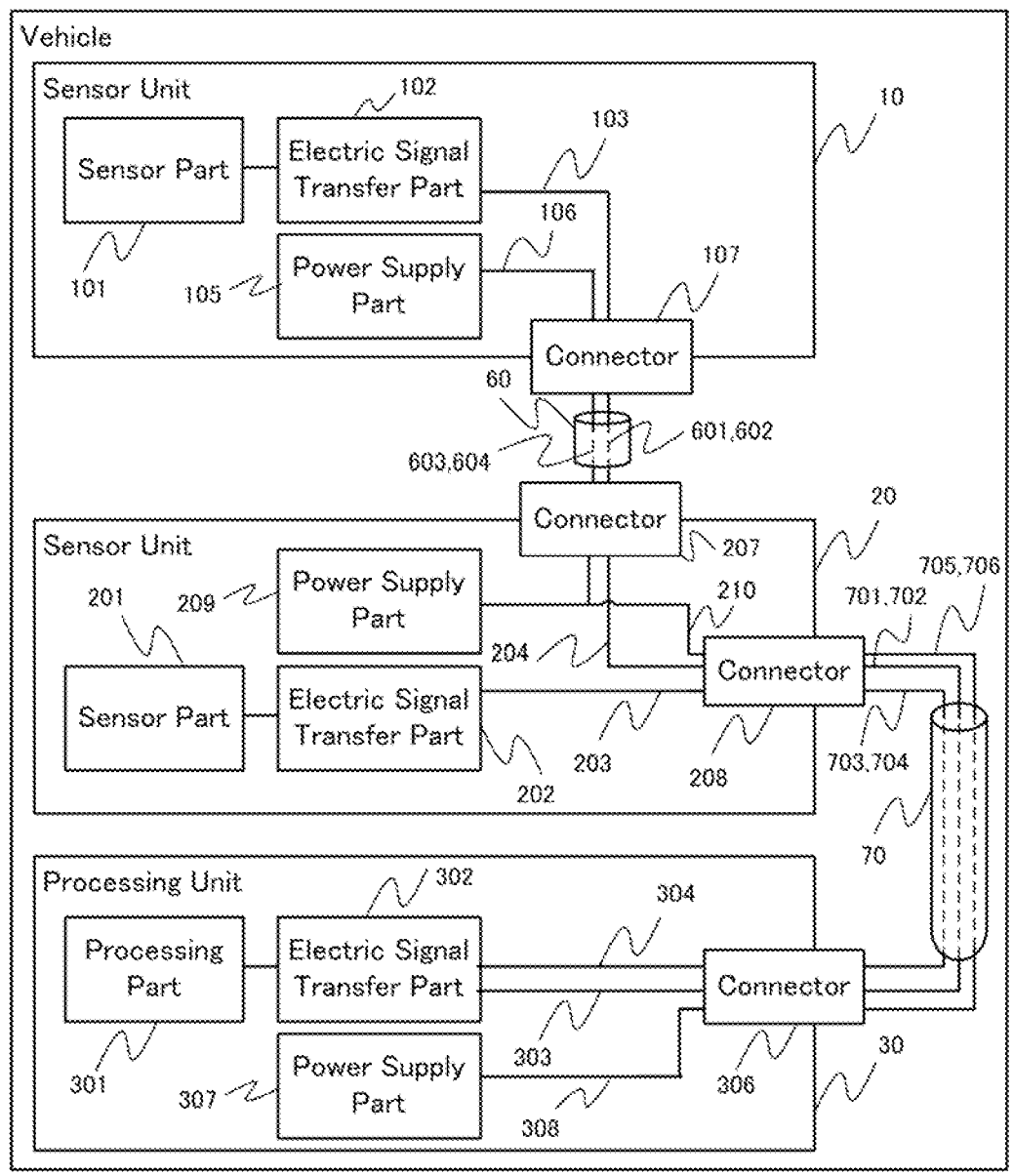
FIG. 6 is a constitution diagram showing an in-vehicle system according to the Embodiment 3.

In FIG. 6, shown is the constitution diagram of the in-vehicle system 100 according to the present Embodiment. The sensor unit 10 (the first in-vehicle unit) according to the present Embodiment consists of a sensor part 101 (a first sensor part), an electric signal transfer part 102 (a first electric signal transfer part), a substrate wiring 103 (a first substrate wiring), a power supply part 105 (a first power supply part), a substrate wiring 106 (a sixth substrate wiring), a connector 107 (a first connector), and the like. In the present Embodiment, the sensor part 101 (the first sensor part) is a millimeter wave radar device. Other than the millimeter wave radar device, the sensor part can include a laser radar, an infrared radar, a camera device, and others. The electric signal transfer part 102 (the first electric signal transfer part), which is connected with the sensor part 101 by substrate wiring, is the one to perform communications for transmitting the distance, direction, and speed of an object (an obstacle) detected by the sensor part 101, to the processing unit 30 (the third in-vehicle unit).

From the processing unit 30 (the third in-vehicle unit) power source is supplied, and the power supply part 105 (the first power supply part) is the one to transform the power source into the voltage used inside of the sensor unit 10 (the first in-vehicle unit). The substrate wiring 103 (the first substrate wiring) is a wiring on the substrate, prepared so that the electric signal transfer part 102 and the connector 107 may be connected, in order to transmit electric signals between the electric signal transfer part 102 and the processing unit 30 (the third in-vehicle unit), through the insulated sheathed cable 60, the sensor unit 20 (the second in-vehicle unit), and the insulated sheathed cable 70. For example, the substrate wiring 103 can employ a differential micro strip line, a differential strip line, and a coplanar line, where those lines have a differential impedance of 100 ohms.

The connector 107 (the first connector) is provided in order to transmit electric signals between the sensor unit 10 (the first in-vehicle unit) and the processing unit 30 (the third in-vehicle unit), through the insulated sheathed cable 60, the sensor unit 20 (the second in-vehicle unit), and the insulated sheathed cable 70. The substrate wiring 106 (the sixth substrate wiring) is a wiring on the substrate, prepared so that the power supply part 105 and the connector 107 may be connected. The connector 107 is, for example, a four-pole connector, which is mounted on the substrate of the sensor unit 10 (the first in-vehicle unit), in order to fit with the insulated sheathed cable 60 which has a differential signal line 601, a differential signal line 602, a differential signal line 603, and a differential signal line 604.

The sensor unit 20 (the second in-vehicle unit) consists of a sensor part 201 (a second sensor part), an electric signal transfer part 202 (a second electric signal transfer part), a substrate wiring 203 (a second substrate wiring), a substrate wiring 204 (a third substrate wiring), a connector 207 (a second connector), a connector 208 (a third connector), a power supply part 209 (a second power supply part), a substrate wiring 210 (a seventh substrate wiring), and the like. In the present Embodiment, the sensor part 201 (the second sensor part) is a millimeter wave radar device. Other than the millimeter wave radar device, the sensor part can include a laser radar, an infrared radar, a camera device, and others. The electric signal transfer part 202 (the second electric signal transfer part), which is connected with the sensor part 201 by substrate wiring, is the one to perform communications for transmitting the distance, direction, and speed of an object (an obstacle) detected by the sensor part 201, to the processing unit 30 (the third in-vehicle unit).

The substrate wiring 203 (the second substrate wiring) is a wiring on the substrate, prepared so that the electric signal transfer part 202 and the connector 208 may be connected, in order to transmit electric signals between the electric signal transfer part 202 and the processing unit 30 (the third in-vehicle unit), through the insulated sheathed cable 70. For example, the substrate wiring 203 can employ a differential micro strip line, a differential strip line, and a coplanar line, where those lines have a differential impedance of 100 ohms. The connector 207 (the second connector) is provided in order to transmit electric signals between the sensor unit 10 (the first in-vehicle unit) and the processing unit 30 (the third in-vehicle unit), through the insulated sheathed cable 60, the sensor unit 20 (the second in-vehicle unit), and the insulated sheathed cable 70.

The substrate wiring 204 (the third substrate wiring) is a wiring on the substrate, prepared so that the connector 207 and the connector 208 may be connected. For example, the substrate wiring 204 can employ a differential micro strip line, a differential strip line, and a coplanar line, where those lines have a differential impedance of 100 ohms. From the processing unit 30 (the third in-vehicle unit) power source is supplied, and the power supply part 209 (the second power supply part) is the one to transform the power source into the voltage used inside of the sensor unit 20 (the second in-vehicle unit).

The substrate wiring 210 (the seventh substrate wiring) is, for example, a branched T type wiring on the substrate, prepared so that the power supply part 209 and the connector 208 may be connected, in order to transmit the power source, and moreover, prepared so that the connector 208 and the connector 207 may be connected. The connector 207 (the second connector) is, for example, a four-pole connector, mounted on the substrate of the sensor unit 20 (the second in-vehicle unit), in order to fit with the insulated sheathed cable 60. The connector 208 (the third connector) is, for example, a six-pole connector, mounted on the substrate of the sensor unit 20 (the second in-vehicle unit), in order to fit with the insulated sheathed cable 70, which has a differential signal line 701, a differential signal line 702, a differential signal line 703, a differential signal line 704, a differential signal line 705, and a differential signal line 706.

The processing unit 30 (the third in-vehicle unit) consists of a processing part 301, an electric signal transfer part 302 (a third electric signal transfer part), a substrate wiring 303 (a fourth substrate wiring), a substrate wiring 304 (a fifth substrate wiring), a connector 306 (a fourth connector), a substrate wiring 308 (an eighth substrate wiring), a power supply part 307 (a third power supply part), and the like. The processing part 301 performs the output control and on-off control of the sensor unit 10 (the first in-vehicle unit) and the sensor unit 20 (the second in-vehicle unit), through the electric signal transfer part 302 connected by substrate wiring, and in addition, receives the outputs from the sensor unit 10 (the first in-vehicle unit) and the sensor unit 20 (the second in-vehicle unit). Based on the outputs received from the sensor unit 10 (the first in-vehicle unit) and the sensor unit 20 (the second in-vehicle unit), the processing part 301 judges whether there exists an obstacle or not. When it is judged that an obstacle exists, the processing part 301 outputs the position and relative velocity of the obstacle, to other electronic control units, through multiple communication lines and the like.

The power supply part 307 (the third power supply part) is the one to supply the power source from the processing unit 30 (the third in-vehicle unit) to the sensor unit 10 (the first in-vehicle unit) and the sensor unit 20 (the second in-vehicle unit). The electric signal transfer part 302 (the third electric signal transfer part) is the one to communicate with the sensor unit 10 (the first in-vehicle unit) and the sensor unit 20 (the second in-vehicle unit). The substrate wiring 303 (the fourth substrate wiring) is a wiring on the substrate, prepared so that the electric signal transfer part 302 and the connector 306 may be connected, in order to transmit electric signals between the electric signal transfer part 302 and the sensor unit 10 (the first in-vehicle unit), through the insulated sheathed cable 70, the sensor unit 20 (the second in-vehicle unit), and the insulated sheathed cable 60. For example, the substrate wiring 303 can employ a differential micro strip line, a differential strip line, and a coplanar line, where those lines have a differential impedance of 100 ohms.

The substrate wiring 304 (the fifth substrate wiring) is a wiring on the substrate, prepared so that the electric signal transfer part 302 and the connector 306 may be connected, in order to transmit electric signals between the electric signal transfer part 302 and the sensor unit 10 (the first in-vehicle unit), through the insulated sheathed cable 70, the sensor unit 20 (the second in-vehicle unit), and the insulated sheathed cable 60. For example, the substrate wiring 304 can employ a differential micro strip line, a differential strip line, and a coplanar line, where those lines have a differential impedance of 100 ohms. The connector 306 (the fourth connector) is, for example, a six-pole connector, mounted on the substrate of the processing unit 30 (the third in-vehicle unit), in order to fit with the insulated sheathed cable 70. The substrate wiring 308 (the eighth substrate wiring) is a wiring on the substrate, prepared so that the power supply part 307 and the connector 306 may be connected, in order to transmit the power source.

Figure 7:
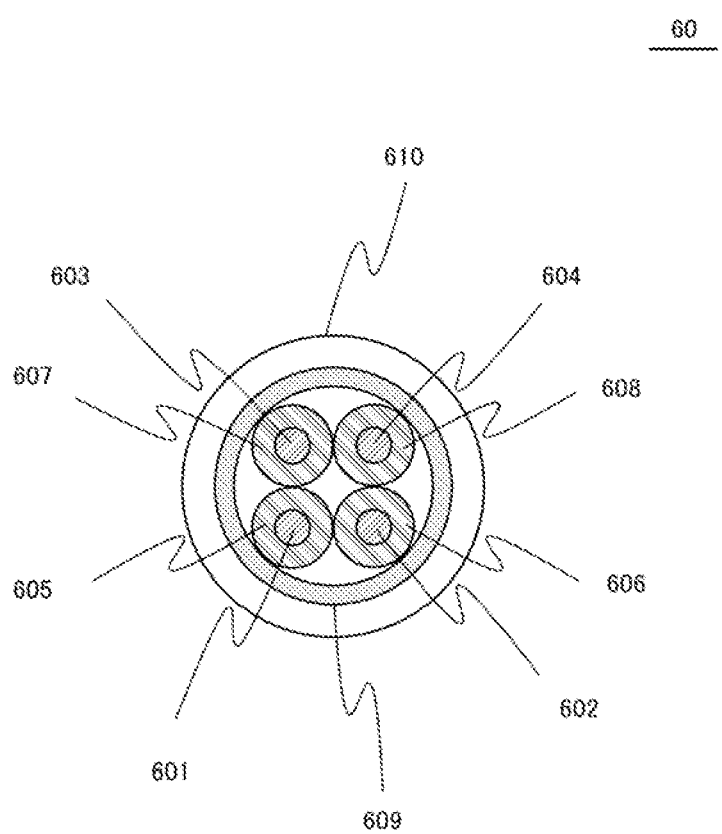
FIG. 7 is a sectional view showing the internal structure of the insulated sheathed cable 60 according to the Embodiment 2.

FIG. 7 shows a sectional view of the insulated sheathed cable 60 (the first insulated sheathed cable). The insulated sheathed cable 60 has a configuration in which a conductor film 609 (a first conductor film) and an insulated protective film 610 are coated sequentially around two sets of twisted pair wirings (a first twisted pair wiring and a second twisted pair wiring). It is worth noticing that, predetermined conductor films, such as composite film composed of aluminum foil and polyester film (AL-PET) or aluminum tape of shield use, are used for the conductor film 609 (the first conductor film). In the first set of twisted pair wirings (the first twisted pair wiring), the differential signal line 601 and the differential signal line 602 are respectively coated with the insulating layer 605 and the insulating layer 606, and those signal lines are bundled in that state to form a twisted pair wiring.

In the second set of twisted pair wirings (the second twisted pair wiring), the differential signal line 603 and the differential signal line 604 are respectively coated with the insulating layer 607 and the insulating layer 608, and those signal lines are bundled in that state to form a twisted pair wiring. However, the wiring for suppling the power source (the differential signal line 603, the differential signal line 604, the insulating layer 607, and the insulating layer 608) may not necessarily be a twisted pair wiring, and a simple pair wiring (the first pair wiring) consisting of two wirings may be used. One end of the insulated sheathed cable 60 is combined with the connector 107, and the other end is combined with the connector 207.

Figure 8:
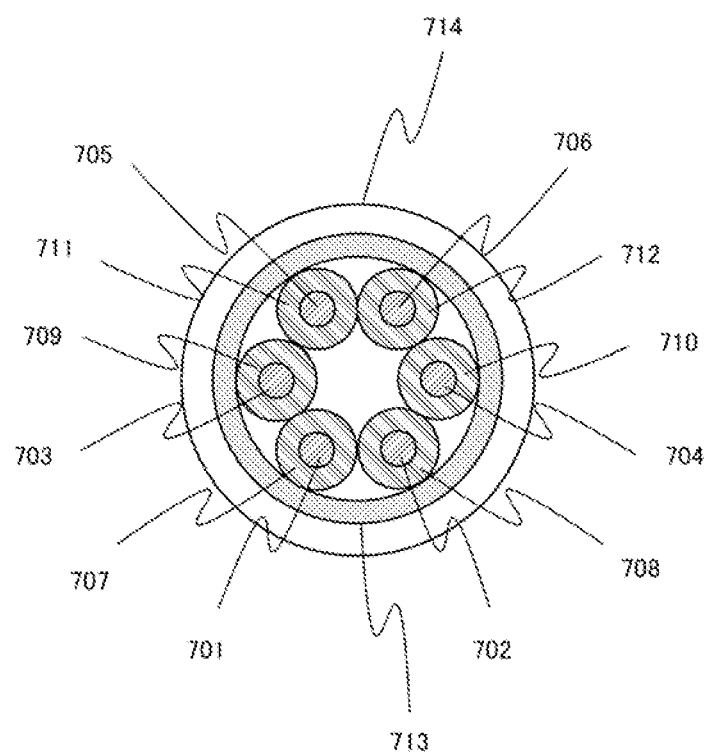
FIG. 8 is a sectional view showing the internal structure of the insulated sheathed cable 70 according to the Embodiment 2.

FIG. 8 shows a sectional view of the insulated sheathed cable 70 (the second insulated sheathed cable). The insulated sheathed cable 70 has a configuration in which a conductor film 713 (a second conductor film) and an insulated protective film 714 are coated sequentially around three sets of twisted pair wirings (a first twisted pair wiring, a second twisted pair wiring, and a third twisted pair wiring). It is worth noticing that, predetermined conductor films, such as composite film composed of aluminum foil and polyester film (AL-PET) or aluminum tape of shield use, can be used for the conductor film 713 (the second conductor film). In the first set of twisted pair wirings (the first twisted pair wiring), the differential signal line 701 and the differential signal line 702 are respectively coated with the insulating layer 707 and the insulating layer 708, and those signal lines are bundled in that state to form a twisted pair wiring.

In the second set of twisted pair wirings (the second twisted pair wiring), the differential signal line 703 and the differential signal line 704 are respectively coated with the insulating layer 709 and the insulating layer 710, and those signal lines are bundled in that state to form a twisted pair wiring. In the third set of twisted pair wirings (the third twisted pair wiring), the differential signal line 705 and the differential signal line 706 are respectively coated with the insulating layer 711 and the insulating layer 712, and those signal lines are bundled in that state to form a twisted pair wiring. However, the wiring for suppling the power source (the differential signal line 705, the differential signal line 706, the insulating layer 711, and the insulating layer 712) may not necessarily be a twisted pair wiring, and a simple pair wiring consisting of two wirings (the second twisted pair wiring) may be used. One end of the insulated sheathed cable 70 is combined with the connector 208, and the other end is combined with the connector 306.

According to the present Embodiment, in the sensor unit 20 (the second in-vehicle unit), the insulated sheathed cable includes a conductor film and an insulated protective film, and a power supply, each of which is employed in common. In the sensor unit 20 (the second in-vehicle unit), one insulated sheathed cable is used to cable with the sensor unit 10 and another is used to cable with the processing unit 30. Then, it becomes possible to reduce the weight of insulated sheathed cables. As an example, the radius of differential signal line+insulating layer is set as r, and the thickness of conductor film+insulated protective film is set as d. The cross-sectional area of the insulated sheathed cable 60 (conductor film+insulated protective film) becomes πd{d+(+1)r}. The cross-sectional area of the insulated sheathed cable 70 (conductor film+insulated protective film) becomes πd{d+3r}.

Like in the previous Embodiment, in a comparative example, a vehicle is assumed in which two insulated sheathed cables are used to cable from the neighborhood of the sensor unit 20 (the second in-vehicle unit) to the processing unit 30 (the third in-vehicle unit), where the arrangement of the sensor unit 10 (the first in-vehicle unit), the sensor unit 20 (the second in-vehicle unit), and the processing unit (the third in-vehicle unit) does not change. In the vehicle according to this comparative example, two insulated sheathed cables 40 are needed. For the above reason, the total cross-sectional area of the insulated sheathed cable of the comparative example (conductor film+insulated protective film) becomes 2πd{d+(+1) r}, and eight differential signal lines are required.

In the insulated sheathed cable according to the present Embodiment, the differential signal line becomes 75% of the comparative example in weight, and the sum total weight (conductor film+insulated protective film) becomes (d+3r)/{2d+(2√2+2)r} of the comparative example. In terms of figures, the sum total weight becomes about 50% to 62%, and the weight reduction of insulated sheathed cables can be attained. Moreover, in the sensor unit 20 (the second in-vehicle unit), only a connector and a substrate wiring are prepared. Then, it becomes possible to suppress the increase of cost, compared with the case where the device for aggregating signals is mounted, like the one given in the statement of the Background Art (Patent Document 2).

Figure 9:
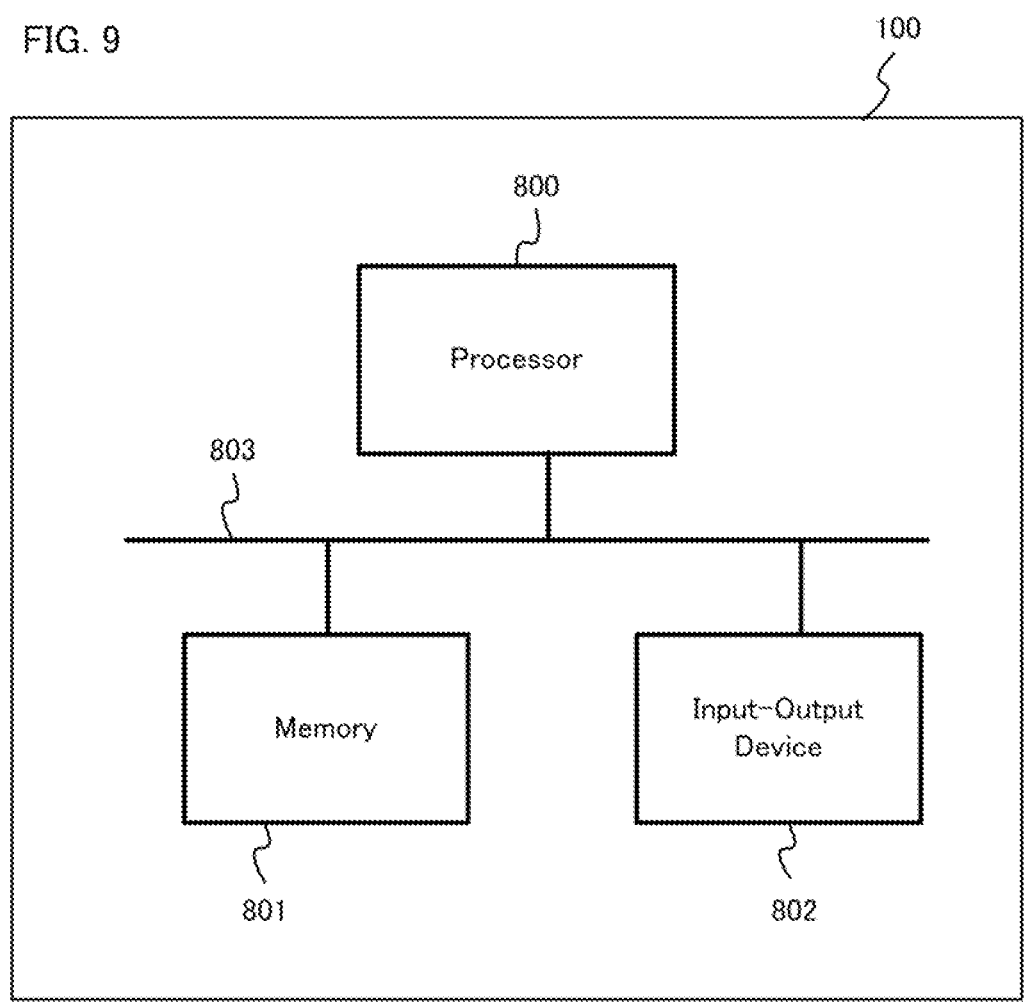
FIG. 9 is a schematic view showing the internal constitution of the in-vehicle unit system according to the Embodiments of the present application.

It is worth noticing that, each of the functional blocks of the sensor unit 10, the sensor unit 20, and the processing unit 30 is achieved by the hardware shown in FIG. 9. This drawing shows an internal constitution of the in-vehicle system 100 according to the Embodiments of the present application. The in-vehicle system 100 is equipped with the processor 800 (Central Processing Unit), the memory 801, the input-output device 802, the network 803 (Data Bus, I/O port), and others. That is, the processor 800, the memory 801 which stores programs and data, and the input-output device 802, such as a sensor, are connected to the network 803 (Data Bus), and processing of data and transmission of data are performed by the control of the processor 800.

Here, the memory 801 corresponds to, for example, nonvolatile or volatile semiconductor memories, such as random access memory, read-only memory, flash memory, EPROM (Erasable Programmable Read Only Memory), EEPROM (Electrically Erasable Programmable Read-Only Memory), magnetic disks, flexible disks, optical discs, compact disks, mini discs, DVDs (Digital Versatile Disc), and the like.

The input-output device 802 is a display (user interface) and the like, and corresponds to the input device and display device in the in-vehicle system 100. Each function in the in-vehicle system 100 is achieved by the processor 800 and the memory 801. The execution part of each function is allowed to be hardware of exclusive use, or a central processing unit which executes the program stored in the memory 801. The central processing unit is also called as a processing unit, an arithmetic unit, a microprocessor, a microcomputer, a processor, and a digital signal processor.

When the execution part of each function is a central processing unit, the function of the in-vehicle system 100 (the sensor part 101, the sensor part 201, the electric signal transfer part 102, the electric signal transfer part 202, the electric signal transfer part 302, and the processing part 301), is achieved by software, firmware, or the combination of software and firmware. Software and firmware are described as a program and stored in the memory 801. The execution part of each function achieves the function of each part, by reading out and executing the program memorized in the memory 801.

Therefore, in the in-vehicle system according to the present Embodiment, the first in-vehicle unit has a first power supply part and a sixth substrate wiring, the second in-vehicle unit has a second power supply part and a seventh substrate wiring, the third in-vehicle unit has a third power supply part and an eighth substrate wiring, the sixth substrate wiring connects the first power supply part and the first connector, the seventh substrate wiring connects the second power supply part, the second connector, and the third connector, and the eighth substrate wiring connects the third power supply part and the fourth connector.

Further, in the in-vehicle system according to the present Embodiment, the first insulated sheathed cable has a first twisted pair wiring, connecting the first substrate wiring and the third substrate wiring, and a first pair wiring, connecting the sixth substrate wiring and the seventh substrate wiring, and the second insulated sheathed cable has a second twisted pair wiring, connecting the third substrate wiring and the fourth substrate wiring, a third twisted pair wiring, connecting the second substrate wiring and the fifth substrate wiring, and a second pair wiring, connecting the seventh substrate wiring and the eighth substrate wiring.

Further, in the in-vehicle system according to the present Embodiment, the first insulated sheathed cable has a first conductor film which covers the first twisted pair wiring and the first pair wiring, and the second insulated sheathed cable has a second conductor film which covers the second twisted pair wiring, the third twisted pair wiring, and the second pair wiring.

The present application relates to an in-vehicle system which is provided with an in-vehicle unit and two or more cables connected with the in-vehicle unit. The in-vehicle unit has a first substrate wiring prepared on a substrate, in order to transmit electric signals transmitted from one or more first cables to a cable other than the first cable (a second cable); and a second substrate wiring, or a substrate wiring other than the first substrate wiring, for transmitting electric signals of the in-vehicle unit to the second cable, wherein the second cable 2 contains, in its insulated coating, a wiring for transmitting electric signals of the first cable and a wiring for transmitting electric signals of the in-vehicle unit. The benefit of the present application is that the in-vehicle system is capable of reducing the weight of coatings, since the coating of cables is in common.

Moreover, the in-vehicle system described in the present application, includes an in-vehicle unit other than the before-mentioned in-vehicle unit (in the following, the second in-vehicle unit) which is connected to the second cable; and an in-vehicle unit other than the before-mentioned in-vehicle unit (in the following, the third in-vehicle unit) which is connected to the first cable, wherein the in-vehicle unit is arranged on the cabling route between the second in-vehicle unit and the third in-vehicle unit. The benefit of the present application is that, the in-vehicle system is capable of reducing the weight of cables, since coatings become in common, by uniting overlapped wirings inside the cables in one cable.

Moreover, in the in-vehicle system described in the present application, the second cable includes further a power source distributing wiring in the insulated coating, and the power source supplied from the second cable is distributed to the in-vehicle unit and the first cable. The benefit of the present application is that, the weight of a cable can be reduced, since the cable employs a common power source wiring. Moreover, in the in-vehicle system described in the present application, the first cable and the second cable have a shield coating between wiring and insulated coating. The benefit of the present application is that, the weight of a cable can be reduced further, since the cable employs a common shield.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 Vehicle: 1a Front Grille: 1b Front Bumper: 10 Sensor Unit: 20 Sensor Unit: 30 Processing Unit: 40 Insulated Sheathed Cable: 50 Insulated Sheathed Cable: 60 Insulated Sheathed Cable: 70 Insulated Sheathed Cable: 100 In-vehicle System: 101 Sensor Part: 102 Electric Signal Transfer Part: 103 Substrate Wiring: 104 Connector: 105 Power Supply Part: 106 Substrate Wiring: 107 Connector: 201 Sensor Part: 202 Electric Signal Transfer Part: 203 Substrate Wiring: 204 Substrate Wiring: 205 Connector: 206 Connector: 207 Connector: 208 Connector: 209 Power Supply Part: 210 Substrate Wiring: 301 Processing Part: 302 Electric Signal Transfer Part: 303 Substrate Wiring: 304 Substrate Wiring: 305 Connector: 306 Connector: 307 Power Supply Part: 308 Substrate Wiring: 401 Differential Signal Line: 402 Differential Signal Line: 403 Insulating Layer: 404 Insulating Layer: 405 Conductor Film: 406 Insulated Protective Film: 501 Differential Signal Line: 502 Differential Signal Line: 503 Differential Signal Line: 504 Differential Signal Line: 505 Insulating Layer: 506 Insulating Layer: 507 Insulating Layer: 508 Insulating Layer: 509 Conductor Film: 510 Insulated Protective Film,: 601 Differential Signal Line: 602 Differential Signal Line: 603 Differential Signal Line: 604 Differential Signal Line: 605 Insulating Layer: 606 Insulating Layer: 607 Insulating Layer: 608 Insulating Layer: 609 Conductor Film: 610 Insulated Protective Film: 701 Differential Signal Line: 702 Differential Signal Line: 703 Differential Signal Line: 704 Differential Signal Line: 705 Differential Signal Line: 706 Differential Signal Line: 707 Insulating Layer: 708 Insulating Layer: 709 Insulating Layer: 710 Insulating Layer: 711 Insulating Layer: 712 Insulating Layer: 713 Conductor Film: 714 Insulated Protective Film

What is claimed is:

1. An in-vehicle system, comprising:
a first in-vehicle circuitry, having a first electric signal transfer part, a first substrate wiring, and a first connector, in which the first substrate wiring connects the first electric signal transfer part and the first connector,
a second in-vehicle circuitry, having a second electric signal transfer part, a second substrate wiring, a third substrate wiring, a second connector, and a third connector, in which the second substrate wiring connects the second electric signal transfer part and the third connector, and moreover, the third substrate wiring connects the second connector and the third connector,
a third in-vehicle circuitry, having a third electric signal transfer part, a fourth substrate wiring, a fifth substrate wiring, and a fourth connector, in which the fourth substrate wiring connects the third electric signal transfer part and the fourth connector, and moreover, the fifth substrate wiring connects the third electric signal transfer part and the fourth connector,
a first insulated sheathed cable, connecting the first connector and the second connector, and
a second insulated sheathed cable, connecting the third connector and the fourth connector,
wherein, when the first insulated sheathed cable is connected to the first connector and the second connector, the first substrate wiring and the third substrate wiring become conductive, and
when the second insulated sheathed cable is connected to the third connector and the fourth connector, the second substrate wiring and the fifth substrate wiring become conductive, and moreover, the third substrate wiring and the fourth substrate wiring become conductive.

2. The in-vehicle system according to claim 1, wherein the first insulated sheathed cable has a first conductor film which covers a first twisted pair wiring, connecting the first substrate wiring and the third substrate wiring, and
the second insulated sheathed cable has a second conductor film which covers a second twisted pair wiring, connecting the third substrate wiring and the fourth substrate wiring, and a third twisted pair wiring, connecting the second substrate wiring and the fifth substrate wiring.

3. The in-vehicle system according to claim 1, wherein the first in-vehicle circuitry has a first power supply part and a sixth substrate wiring,
the second in-vehicle circuitry has a second power supply part and a seventh substrate wiring,
the third in-vehicle circuitry has a third power supply part and an eighth substrate wiring,
the sixth substrate wiring connects the first power supply part and the first connector,
the seventh substrate wiring connects the second power supply part, the second connector, and the third connector, and
the eighth substrate wiring connects the third power supply part and the fourth connector.

4. The in-vehicle system according to claim 3, wherein the first insulated sheathed cable has a first twisted pair wiring, connecting the first substrate wiring and the third substrate wiring, and a first pair wiring, connecting the sixth substrate wiring and the seventh substrate wiring, and the second insulated sheathed cable has a second twisted pair wiring, connecting the third substrate wiring and the fourth substrate wiring, a third twisted pair wiring, connecting the second substrate wiring and the fifth substrate wiring, and a second pair wiring, connecting the seventh substrate wiring and the eighth substrate wiring.

5. The in-vehicle system according to claim 4,
wherein the first insulated sheathed cable has a first conductor film which covers the first twisted pair wiring and the first pair wiring, and
the second insulated sheathed cable has a second conductor film which covers the second twisted pair wiring, the third twisted pair wiring, and the second pair wiring.

6. The in-vehicle system according to claim 1,
wherein the first in-vehicle circuitry has a first sensor part connected with the first electric signal transfer part,
the second in-vehicle circuitry has a second sensor part connected with the second electric signal transfer part, and
the third in-vehicle circuitry has a processing part connected with the third electric signal transfer part.

7. The in-vehicle system according to claim 1,
wherein the first in-vehicle circuitry is arranged behind a front grille of a vehicle,
the second in-vehicle circuitry is arranged at one of side parts of a front bumper of the vehicle, and
the third in-vehicle circuitry is arranged in a car room of the vehicle.

* * * * *